Inventor
George A. Schauer, Jr.
By McCanna, Morsbach & Pillote
Atty's

May 26, 1964     G. A. SCHAUER, JR     3,134,373
ENGINE WITH ROTARY VALVE

Filed Feb. 5, 1962     6 Sheets-Sheet 4

Inventor
George A. Schauer, Jr.
By McCanna, Morsbach & Pillote
Attorneys

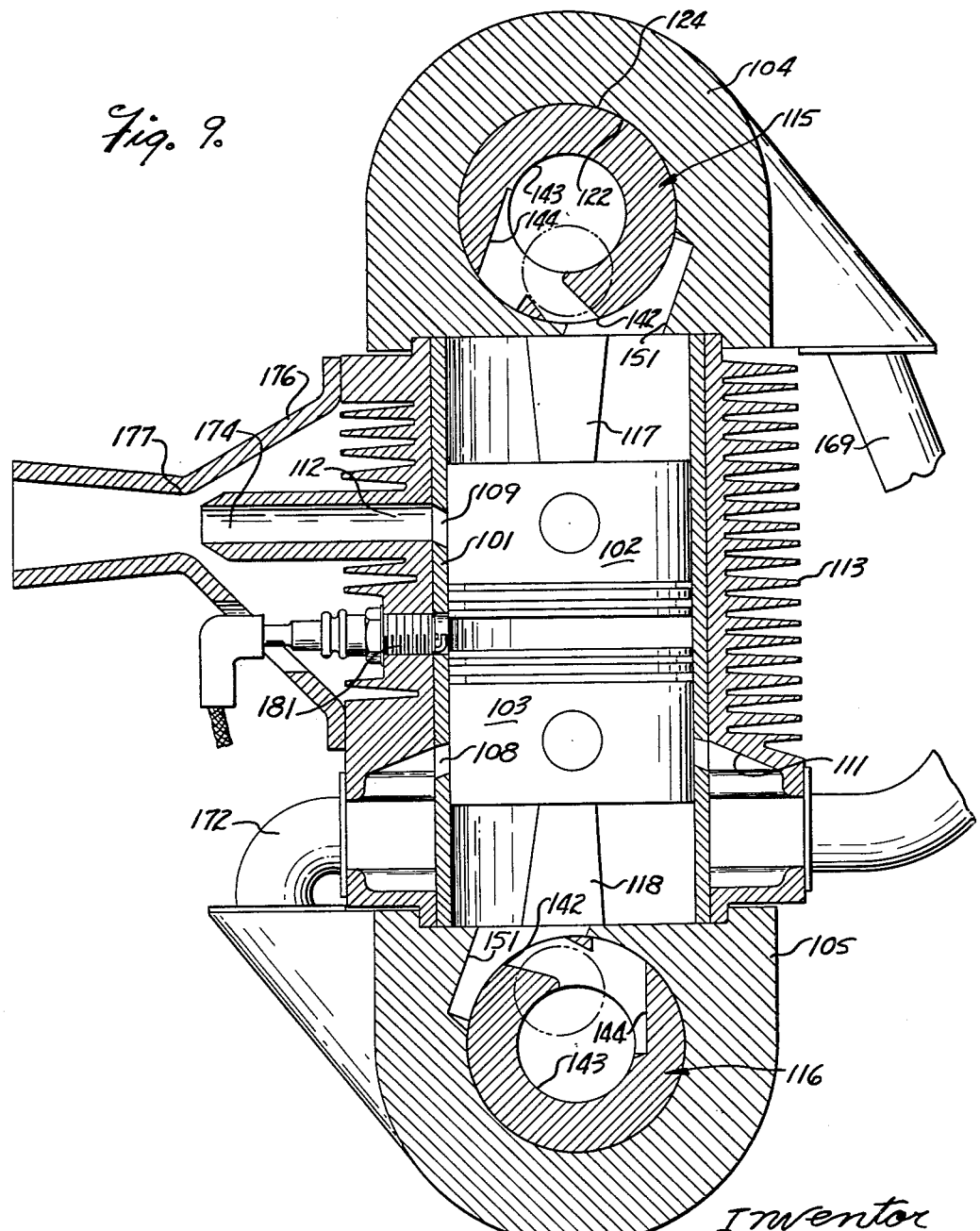

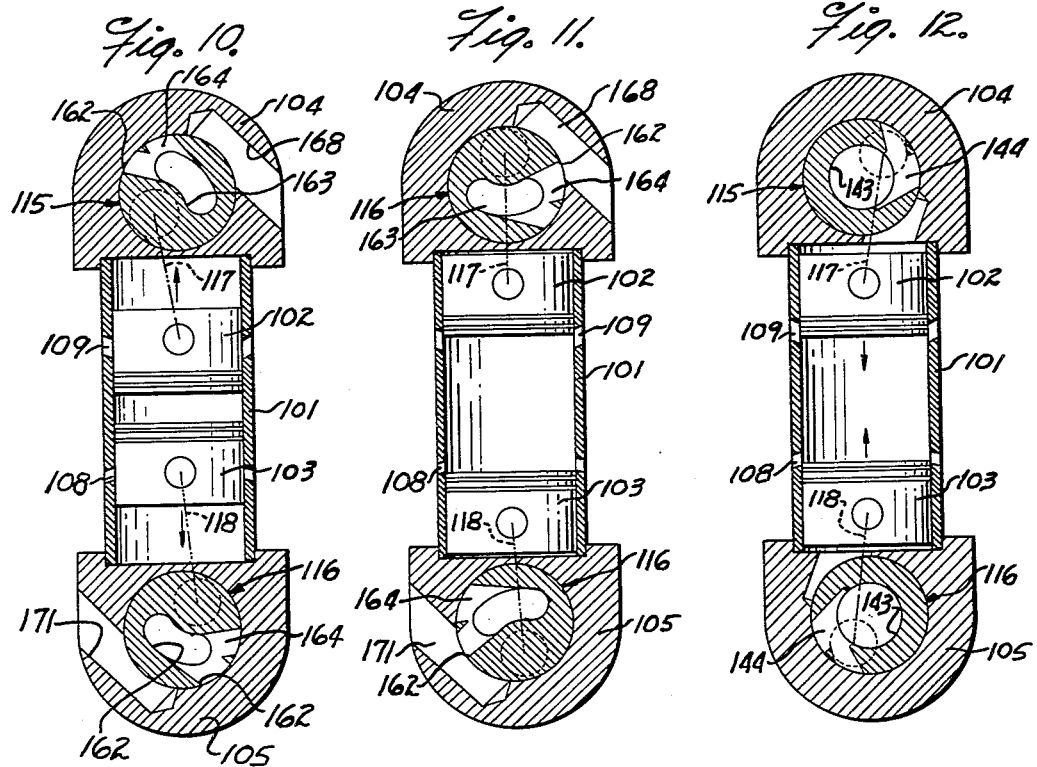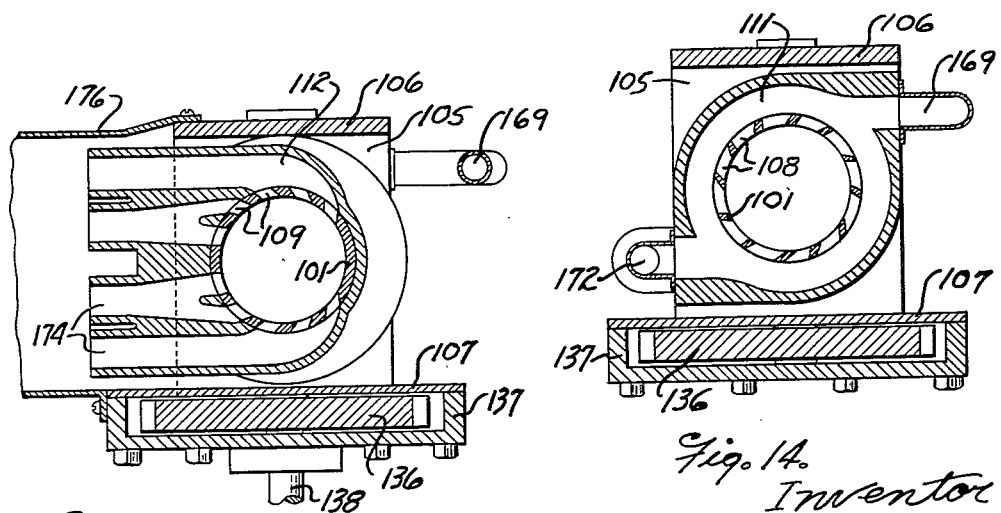

United States Patent Office 3,134,373
Patented May 26, 1964

3,134,373
ENGINE WITH ROTARY VALVE
George A. Schauer, Jr., 507 N. State St., Belvidere, Ill.
Filed Feb. 5, 1962, Ser. No. 171,120
12 Claims. (Cl. 123—51)

This invention relates to improvements in internal combustion engines.

An important object of this invention is to provide an improved rotary valve arrangement for an internal combustion engine and which improves the flow of fuel mixture to the engine and provides efficient scavenging.

Another object of this invention is to provide a rotary valve arrangement for a crankcase induction type fuel feed system and which will increase the flow of fuel mixture to the engine at a rate correlative to the engine speed.

A further object of this invention is to provide, in an engine having a plurality of cylinders and pistons connected to a common crankshaft, a rotary valve arrangement which simplifies the supply of fuel mixture to the several cylinders and which enables independent control of the flow of fuel to the several sidewise aligned crankcase compartments from one end of the crankshaft.

Still another object of this invention is to provide an improved crankshaft valving arrangement for an opposed piston-type engine for valving the flow of fuel mixture into the crankcases at opposite ends of the cylinder and for valving the flow of fuel mixture from both crankcases to the cylinder intake ports.

Yet another object of this invention is to provide a rotary valve-type fuel feed system for an internal combustion engine and which permits use of a minimum volume crankcase compartment for improved crankcase compression.

An additional object of this invention is to provide an internal combustion engine having an improved system for air cooling the engine using the exhaust gases from the engine.

An important feature of this invention resides in the provision of a rotary valve arrangement for a crankshaft induction type fuel feed system which has rotary valves for valving flow from the carburetor to the crankcase and from the crankcase to the cylinder intake ports, all in timed relation with the operation of the engine.

Another feature of this invention resides in the provision of a rotary valve on the crankshaft which is so arranged as to produce a pumping action as the crankshaft rotates, to feed the fuel mixture to the engine at a rate correlative with the engine speed.

These, together with various other objects and advantages of the present invention will be more readily appreciated as the same becomes better understood by reference to the following detailed description when taken in connection with the accompanying drawings wherein:

FIG. 9 is a sectional view through the engine of FIG. 8, taken on the plane 9—9 of FIG. 8;

FIGS. 10 and 11 are diagrammatic sectional views through the engine taken on the plane 10—10 of FIG. 8, and illustrating the pistons and crankshafts in different rotative positions;

FIG. 12 is a diagrammatic sectional view taken on the plane 9—9 of FIG. 8;

FIG. 13 is a transverse sectional view through the engine exhaust manifold taken on the plane 13—13 of FIG. 8; and FIG. 14 is a transverse sectional view through the engine intake manifold taken on the plane 14—14 of FIG. 8.

The present application is a continuation-in-part of my copending application for "Engine Construction," Serial No. 695,935, filed November 12, 1957, now Patent No. 3,023,743.

The rotary valve arrangement of the present invention is generally adapted for use in internal combustion engines using a crankcase induction-type fuel feed system, and is herein shown applied to an opposed piston-type engine having a pair of pistons in each cylinder and a pair of crankcase compartments for each cylinder, it being understood that the rotary valving arrangement can be advantageously used in a conventional engine construction having a single piston and crankcase compartment for each cylinder.

Figure 1:
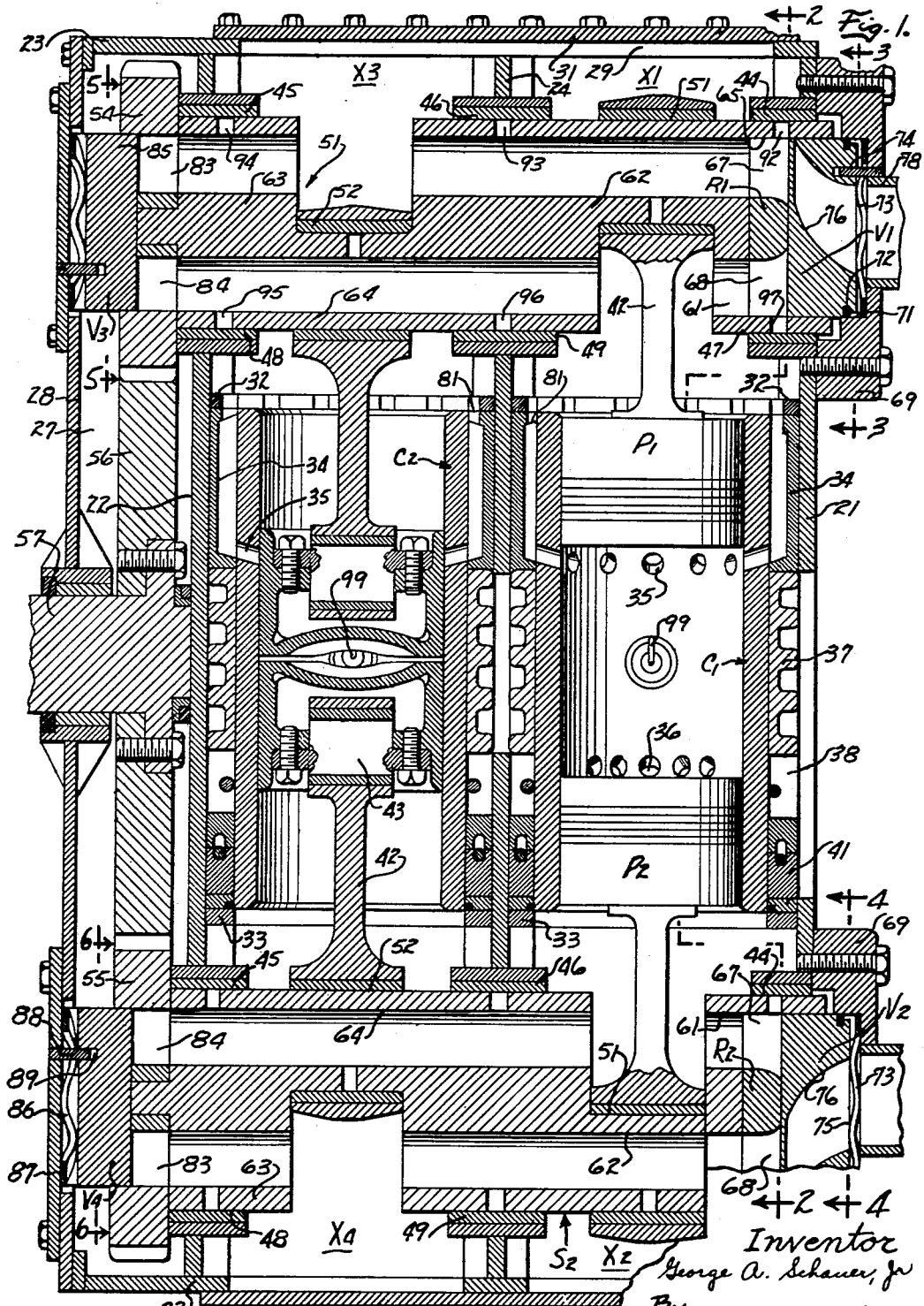
FIGURE 1 is a longitudinal sectional view through the engine taken on a plane parallel to the engine crankshaft.

The invention is shown in FIGS. 1–7 applied to an opposed piston-type engine employing two cylinders in side-by-side relation. The specific engine illustrated herein is conveniently formed with a minimum of cast parts to reduce weight and the machining operations required and, as illustrated, the engine includes a frame having spaced end panels 21 and 22 and crankcase end plates 23. An intermediate panel 24 is located between the end panels 21 and 22 and is attached to the opposed side panels 25 and 26 to form separate crankcase compartments X1, X3 and X2, X4 at opposite ends of the frame. The side panels 25 and 26 and the end plates 23 extend beyond the end panel 22 to form a gear case 27 having a removable cover panel 28. Inspection openings 29 are formed in the crankcases and are covered by removable cover plates 31. A pair of cylinders C1 and C2 are mounted in side-by-side relation as shown in FIG. 1 and extend between the crankcase compartments X1, X2 and X3, X4 respectively. Pairs of crankcase seal plates 32 and 33 are secured to the side panels 25 and 26 and to the end and intermediate panels of the frame in spaced relation to the crankcase end plates to define the aforementioned crankcase compartments and each have openings aligned with the ends of the respective cylinders C1 and C2. An air intake chest 34 surrounds each cylinder and the cylinders have a plurality of air intake ports 35 spaced inwardly from one end thereof and a plurality of exhaust ports 36 spaced inwardly from the other end. The air intake ports in each cylinder communicate with the respective intake chest 34 so that the fuel mixture supplied to the chest passes through the intake ports when the latter are uncovered by the pistons.

The cylinders C1 and C2 are advantageously releasably clamped to the frame, at a point intermediate the ends of the cylinders, to permit free axial expansion and contraction at the end portions of the cylinders. In the embodiment shown, a cooling jacket 37, herein shown in the form of a plurality of cooling fins, is provided on each of the cylinders. Although an air cooled type cylinder is shown, it is apparent that a water jacket may be formed integrally with or pressed on the cylinder to provide a liquid cooled engine, if desired. The cooling jacket on each of the cylinders abuts against the intake chest 34 and an exhaust manifold 38 is disposed around the other end portion of the cylinders and abuts against the end of the cooling jacket 37. The exhaust manifolds each have passages 39 therein (see FIG. 2) which communicate at one end with the exhaust ports 36 and open at the other end to atmosphere. Clamping blocks 41 are interposed between each of the exhaust manifolds and the respective crankcase seal plate to firmly clamp the intermediate portion of each cylinder between the intake manifold and the exhaust manifold therefor, to prevent axially shifting of the cylinder while permitting free axial expansion and contraction of the end portions of the cylinder.

Opposed pairs of pistons designated P1 and P2 are provided in the cylinder C1 and C2. Connecting rods 42 are attached to each of the pistons by wrist pins 43 and the connecting rods are otherwise connected to a respective one of the crankshafts S1 and S2 which are rotatably supported on the crankcases. The crankcases are formed with spaced end bearings 44 and 45 and an intermediate bearing 46 and the crankshafts S1 and S2 have end journal areas 47 and 48 rotatably supported in the end bearings 44 and 45 and an intermediate journal area 49 rotatably supported in the intermediate bearing 46. The crankshafts also have eccentric portions 51 and 52 located intermediate the main journal areas on the crankshaft and the connecting rods are operatively connected to the crankshaft eccentrics. The crankshafts are drivingly interconnected by a gear train including gears 54 and 55 on the crankshafts S1 and S2 respectively, and an intermediate gear 56. The gears 54 and 55 are non-rotatably connected to the respective crankshaft as by a key and fastener (see FIGS. 5 and 6) and the intermediate gear 56 is supported on a stub shaft 57.

In accordance with the present invention, the engine is designed to have a relatively short stroke and the crankshafts S1 and S2 are advantageously made sufficiently large in diameter so that the eccentric portions thereon preferably lie wholly within the crosssection of the crankshaft. This provides a "webless" crankshaft which eliminates the necessity of providing split main bearings 44—46 and permits endwise insertion of the crankshaft into the crankcase. In addition, this crankshaft arrangement facilitates the use of an improved rotary valve arrangement for the crankcase induction system of the engine. More particularly, the crankshafts S1 and S2 are each formed with a passage 61 which extends inwardly from one end of the crankshaft through the journaled area 47 and communicates with a respective one of the crankcase compartments X1 and X2. A second generally straight passage 62 extends inwardly from the aforementioned end of each of the crankshafts and through the end journaled area 47, eccentric portion 51 and intermediate journal area 49 to communicate with a respective one of the crankcase compartments X3 and X4. A further passage 63, conveniently aligned with the passage 62, is formed in each of the crankshafts and extends inwardly from the other end thereof through the end journal area 48 to communicate with the respective one of the crankcase compartments X3 and X4. A fourth passage 64 is also formed in the crankshafts to extend inwardly from the second end thereof, through the end journal area 48, eccentric portion 52 and intermediate journal area 49 to communicate with a respective one of the crankcase compartments X1 and X2. An improved rotary valve means, located in the crankshafts S1 and S2, is provided for controlling the fluid flow of fuel mixture into the crankcase compartments X1, X2, X3 and X4, and from the crankcase compartments to the intake ports of the cylinder.

Figure 2:
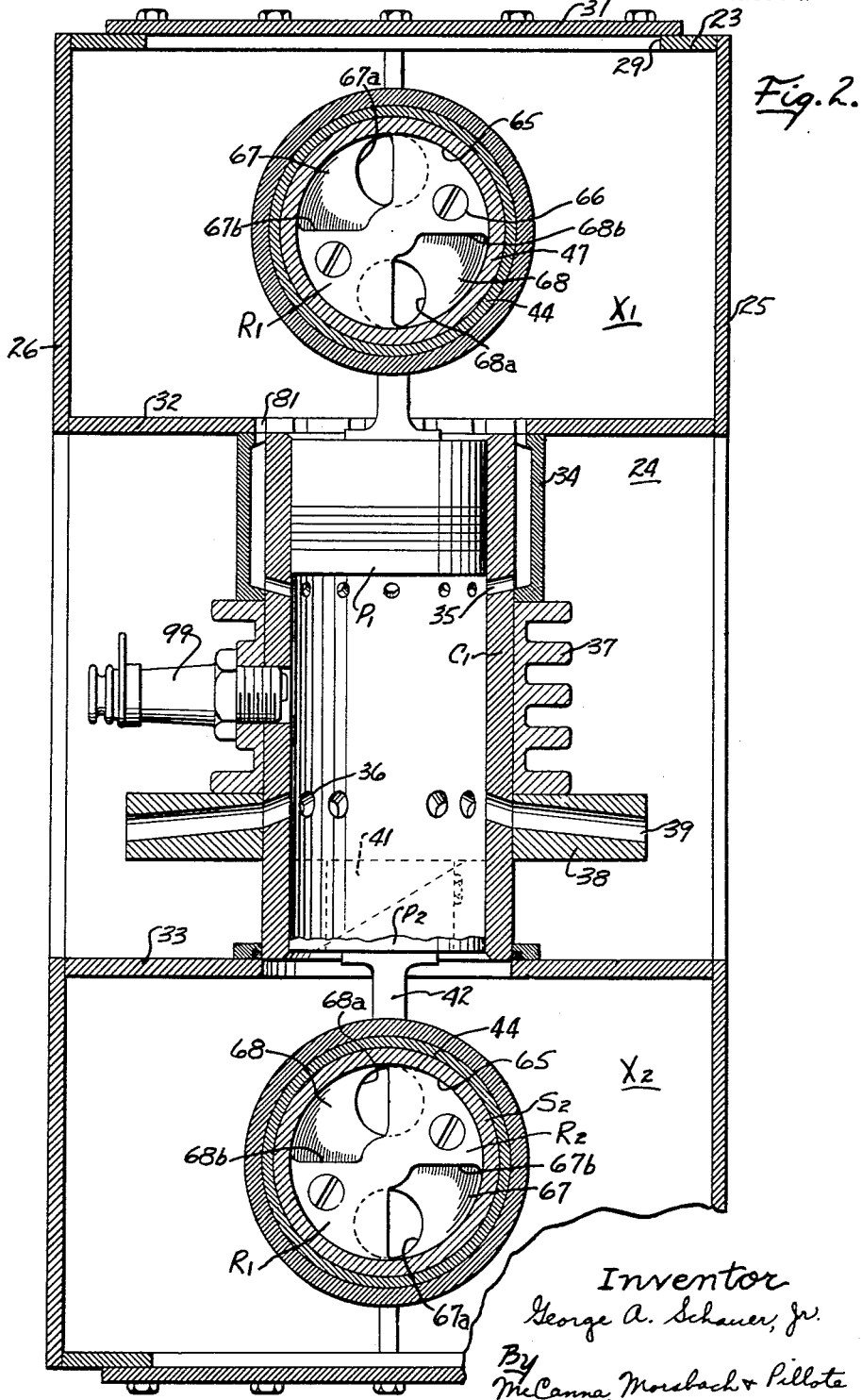
FIG. 2 is a sectional view taken on the plane 2—2 of FIG. 1.
Figure 3:
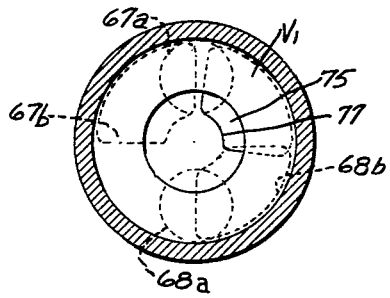
FIG. 3 is a fragmentary sectional view through one of the rotary intake valves taken on the plane 3—3 of FIG. 1.
Figure 5:
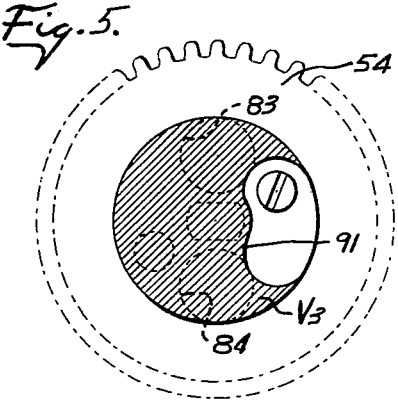
FIG. 5 is a fragmentary sectional view through one of the rotary transfer valves, taken on the plane 5—5 of FIG. 1.
Figure 4:
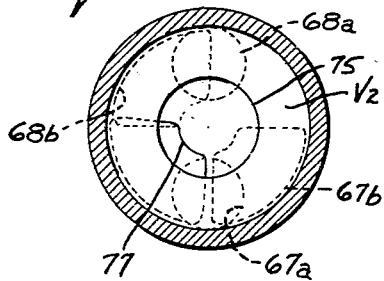
FIG. 4 is a fragmentary sectional view through the other of the rotary intake valves, taken on the plane 4—4 of FIG. 1.
Figure 6:
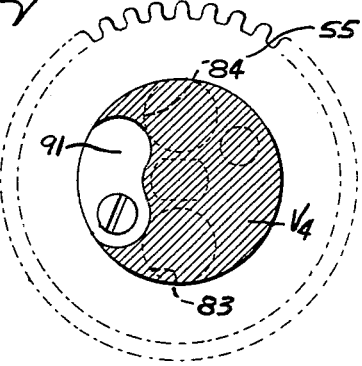
FIG. 6 is a fragmentary sectional view through the other of the rotary transfer valves taken on the plane 6—6 of FIG. 1.
Figure 7:
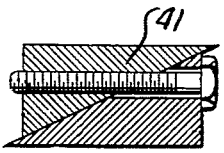
FIG. 7 is a fragmentary sectional view through one of the cylinder clamps.

In the form of the rotary valve illustrated in the embodiment of FIGS. 1–7, the end of each of the crankshafts S1 and S2 is recessed, as indicated at 65, and rotary valve plates R1 and R2 are disposed in the recesses and rigidly secured to the respective crankshafts S1 and S2 as by a fastener 66. As best shown in FIG. 2, each of the rotary valve members R1 and R2 have a pair of passages 67 and 68 therein which respectively communicate with the passages 62 and 61 in the crankshafts. The passages 67 and 68 each have an opening 67a and 68a at one end, herein shown of circular configuration, and disposed in registry with the passages 62 and 61 in the crankshaft. The passages 67 and 68 spiral axially of the valve members in a direction opposite the direction of rotation of the crankshaft from the inlet ends 67b and 68b thereof to outlet openings 67a and 68a. Cooperating stationary valve members V1 and V2 also extend into the recess 65 and abut against the rotary valve plates R1 and R2 respectively. A cover plate 69 is attached to the end panel 21 and slidably supports the stationary valve members V1 and V2 on a shoulder 71 therein. A seal ring 72 is interposed between the stationary valve member and the cover plate and a spring, herein shown in the form of a wave washer 73, is disposed between the cover plate and the stationary valve member to yieldably urge the latter against the rotary valve member. A means, such as a pin 74, is attached to the cover plate and slidably extends into the stationary valve member, to constrain the latter against rotation while permitting axial sliding movement thereof. As shown in FIGS. 3 and 4, the stationary valve members V1 and V2 have a central opening 75 in one end and a passage 76 which extends from the central opening at said one end to an eccentrically located opening 77 at the other end. The opening 77 in each of the stationary valve members is enlarged and extends through approximately 90° and is adapted to register with the ports 67b and 68b in the respective rotary valve members R1 and R2, as the latter rotate. A conduit 78 is attached to each of the cover plates 69 and is adapted for connection to an apparatus such as a carburetor for supplying an air-fuel mixture to the engine.

In the embodiment illustrated, the crankshafts S1 and S2 are arranged to rotate in a counter-clockwise direction, as viewed in FIGS. 3 and 4. As shown therein, the crankshafts are in their dead-center positions, and, as the crankshafts are rotated, the pistons P1 connected to the eccentric portions 51 will begin their compression stroke while the pistons P2 connected to the eccentric portions 52 will begin their expansion stroke. When the crankshafts are in the position shown in FIG. 1, the ports 77 in each of the stationary valve members V1 and V2 is out of communication with the port 67b, and are just beginning to communicate with the port 68b in the rotary valve member. As the crankshafts are rotated from the positions shown in FIGS. 3 and 4, the ports 68b therein move into registry with the ports 77 in the respective valve members so as to permit the air-fuel mixture to flow in through the passages 61 in the crankshafts into the crankcase compartments X1 and X2, while the pistons P1 move in their compression stroke. This draws the combustible mixture into the compartments X1 and X2. At this time, the ports 67b are closed so that the combustible mixture from the supply line 78 does not pass into the passages 62 in the crankshafts. Passages 81 are formed in the seal plates 32 so as to permit the combustible mixture in the crankcase compartments X1 and X3 to pass upwardly into the air intake chest 34 around the cylinders C1 and C2 respectively. Thus, the charge of combustible mixture from the crankcase X3 will be forced upwardly through the passages 81 into the intake chest 34 and through the inlet ports 25, when the latter are uncovered by the pistons P2 in their expansion stroke. When the crankshafts S1 and S2 reach their opposite dead-center position, the ports 77 in the stationary valve members V1 and V2 are out of registry with the ports 68b in the rotary valve members, and begin to communicate with the ports 67b so as to permit the passage of combustible mixture through the passages 62 in the crankshafts S1 and S2 and into the crankcase compartments X3 and X4.

The aforedescribed rotary valve arrangement is provided on each of the crankshafts and, in accordance with the present invention, a rotary transfer valve arrangement is provided for communicating the crankcase compartments X2 and X4 with the crankcase compartments X1 and X3 respectively, during the expansion stroke of the respective pistons P1 and P2. More specifically, the gears 54 and 55, as best shown in FIG. 1, have openings 83 and 84 therein which communicate with the passages 63 and 64 in the crankshafts. The gears also have a recess 85 in the outer face and stationary valve members V3 and V4 are rotatably received in the recesses. A spring 86 is interposed between the gear case cover plate 87 and the respective stationary valve member, to yieldably urge the latter against the bottom of the recess in the gears. A pin 88 is mounted on the cover plate 87 and is slidably received in a recess 89 in the stationary valve member to constrain the latter against rotation.

The stationary valve members V3 and V4 each have a port 91 therein adapted to register with the openings 83 and 84 in the gears as the latter are rotated. The ports 91 conveniently open at one side of the rotary valve member, externally of the gear, and are dimensioned and arranged so as to communicate with one of the openings in the gear as the crankshaft is rotated from one dead-center position to another dead-center position, and to communicate with the other of the openings in the gear, as the crankshaft is rotated back to its initial position. In particular, the ports 91 in the stationary valve members V4 and V3 are arranged to register with the passages 83 in the gears 54 and 55 respectively, during the expansion stroke of the pistons P2, to communicate the crankcase compartment X4 with the gear case 27 and to also communicate the gear case with the crankcase compartment X3. In this manner, the combustible mixture in the crankcase compartment X4, which is displaced during the expansion stroke of the piston P2, is passed through the gear case to the compartment X3 to flow therefrom into the intake manifold or chest around the cylinder C2. The stationary valves V3 and V4 close the ports 84 in the gears 54 and 55, during the expansion stroke of the pistons P2, to permit a charge of combustible air-gas mixture to be drawn into the compartments X1 and X2 during the compression stroke of pistons P1. During the compression stroke of pistons P2 (the expansion stroke of pistons P1), the rotary valve is operative to block communication of the crankcase compartments X3 and X4 with the gear case and to instead communicate the crankcase compartments X2 and X1 with the gear case to feed combustible air-fuel mixture from the crankcase compartment X2 to the crankcase compartment X1. In order to improve the lubrication of the main and crankcase bearings, lateral passages 92—98 inclusive are formed in the crankshafts S1 and S2 and communicate with longitudinally extending passages therein to convey the lubricant containing air-fuel mixture to the bearing surfaces. The embodiment of FIGS. 1–7 is arranged for operation as a two-cycle internal combustion engine and, a spark plug 99 is provided in the cylinder to ignite the charge therein at the proper time during the compression stroke.

In the embodiment of FIGS. 8–14, the invention is shown applied to a single cylinder opposed piston-type engine. While the improved rotary valve arrangement has certain additional advantages when applied to such an opposed piston engine, it is contemplated that the rotary valve arrangement shown is also adapted for use in a conventional engine.

Figure 8:
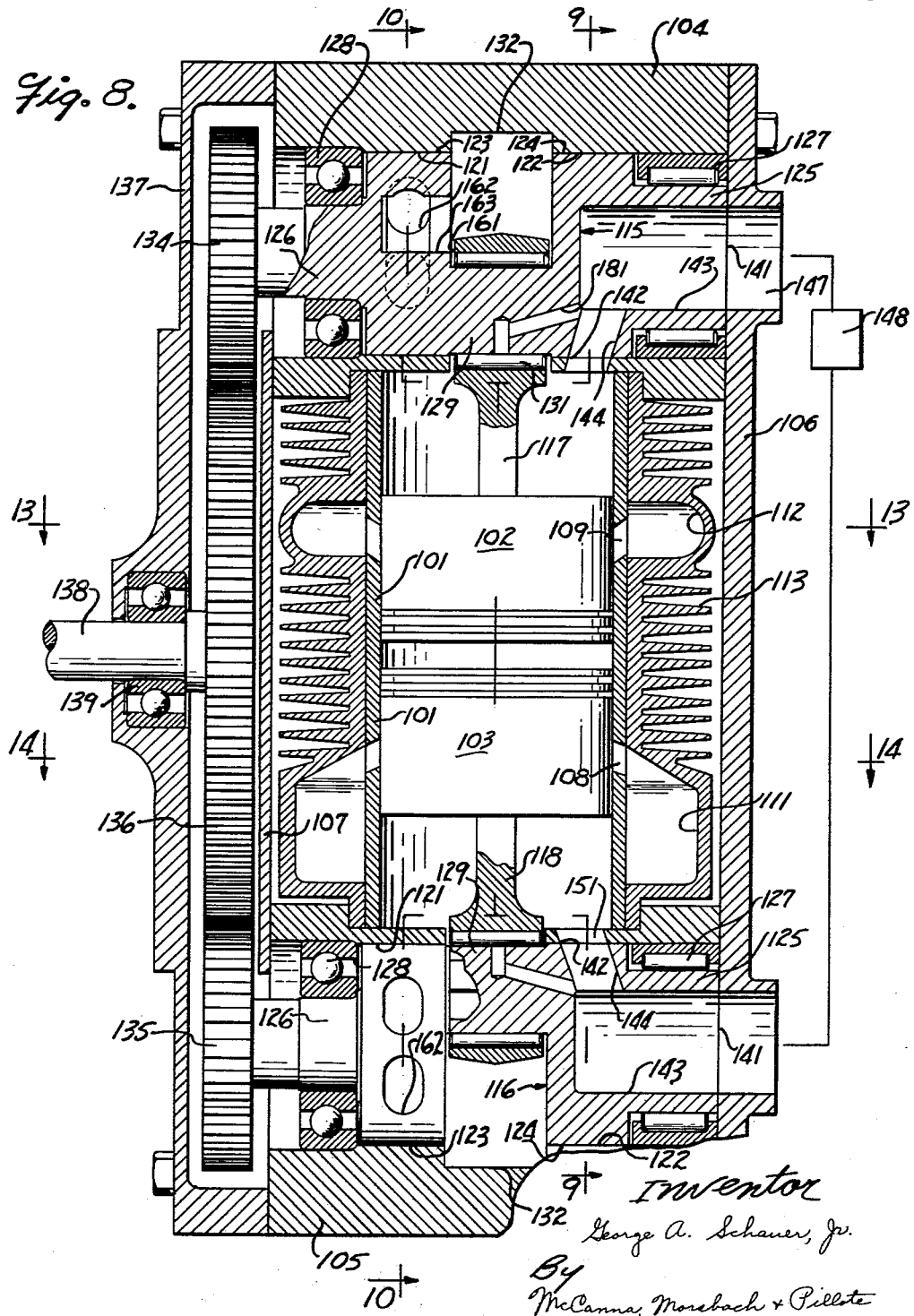
FIG. 8 is a sectional view through a modified form of engine construction taken on a plane parallel to the crankshaft.

In general, the present invention includes a cylinder, at least one piston in the cylinder, at least one crankcase and a crankshaft rotatably journaled in the crankcase and operatively connected to the piston. In accordance with the present invention, the crankshaft is provided with a rotary inlet valve for valving the flow of fuel mixture to the crankcase and which rotary valve is advantageously so arranged to produce a pumping action in response to rotation of the crankshaft for feeding fuel mixture to the crankcase at a rate that increases with engine speed. The crankshaft is also advantageously provided with a rotary transfer valve for valving the flow of fuel mixture from the crankcase to the inlet ports of the cylinder and which transfer valve is advantageously arranged to produce a pumping action for enhancing the flow of fuel mixture from the crankcase to the inlet ports of the cylinder. In the embodiment shown, the engine includes a cylinder 101 having opposed pistons 102 and 103 therein. Crankcases 104 and 105 are provided at opposite ends of the cylinder and, as shown in FIG. 8, are interconnected by plates 106 and 107. The cylinder has intake ports 108 spaced inwardly from one end and exhaust ports 109 spaced axially from the other end. An intake air chest 111 extends around the cylinder and communicates with the inlet ports 108 and an exhaust manifold 112 extends around the cylinder adjacent the exhaust ports 109 in communication therewith. In the form shown, the cylinder is air cooled and is provided with cooling fins 113, it being understood that other cooling arrangements such as liquid cooling jackets could be provided, if desired.

Crankshafts 115 and 116 are rotatably supported in each crankcase and operatively connected to the respective piston 102 and 103 by means of connecting rods 117 and 118. In accordance with the present invention, rotary valve means is provided in each of the crankshafts for valving the flow of fuel mixture and for also producing a pumping action to increase the flow of mixture to the engine at high engine speeds. The crankshaft is advantageously of the "webless" type described in connection with the previous embodiment and, as best shown in FIG. 8, the crankcases each have a substantially straight bore extending therethrough defining annular areas 121 and 122 which rotatably receive axially spaced annular portions 123 and 124 on each of the crankshafts 115 and 116. The crankshafts are conveniently formed with reduced diameter end portions 125 and 126 which are rotatably supported in the crankcase by bearings 127 and 128. Each crankshaft has an eccentric portion 129 located intermediate the annular portions 123 and 124, and which eccentric portion is preferably disposed within the cross-section of the annular portions to provide the aforementioned webless crankshaft. The connecting rods 117 and 118 are rotatably connected to the respective eccentric portion 129, as by anti-friction bearing element 131, and the crankcases 104 and 105 are recessed at 132 intermediate the annular areas 121 and 122 to provide clearance for the connecting rods. The crankshafts 115 and 116 are drivingly interconnected for rotation in timed relation with each other. One suitable arrangement is illustrated in FIG. 8 and includes pinion gears 134 and 135 nonrotatably attached to the crankshafts 115 and 116 respectively, and an intermediate gear 136 disposed in meshing engagement with the pinion gears. The gears are conveniently enclosed in a gear case 137 and, as shown, an output shaft 138 is attached to the intermediate gear and is rotatably supported in a bearing 139 on the gear case.

The crankshafts 115 and 116 each have a rotary inlet valve therein, and which rotary inlet valves include an inlet port 141 preferably disposed adjacent the axis of the crankshafts, and an outlet port 142 spaced radially outwardly from the inlet port and connected with the inlet port through a passageway. In the embodiment shown, passageway includes an enlarged generally axially extending bore 143 extending inwardly from one end of each of the crankshafts, and outwardly extending openings 144. As is clearly shown in FIGS. 9 and 12, the outwardly extending openings 144 preferably spiral from the inlet bore 143 to the outlet ports 142 in a direction opposite the direction of rotation of the crankshafts so as to enhance the centrifugal pumping action produced when the crankshaft rotates. The openings 144 are conveniently formed by drilling one or more holes into the shaft with the holes extending generally tangent to the internal bore 143. It is apparent, however, that the openings 143 can be formed in any desired manner. The rotary inlet valves have the inlet port 141 thereof in continuous communication with inlet passages 147 formed in the crankcases 104 and 105, and which inlet passages are connected to a carburetor 148 or the like for supplying an air-fuel mixture to the engine. The outlet ports 142 of the rotary inlet valves are preferably located in the annular portions 124 of the crankshafts so that flow therethrough is normally cut off by the annular areas 122 of the crankcase, and an inlet passage 151 is formed in the crankcase. The inlet passage as shown in FIG. 9, has one end in continuous communication with the crankcase at the underside of the respective pistons 102 and 103, and the other end positioned to communicate with the outlet ports 142 of the rotary valves to pass air-fuel mixture into the crankcase during the compression stroke of the pistons. The rotary inlet valve not only avoids the flow losses inherent in reed-type valves, but in addition, produces a pumping action which augments the flow of fuel mixture into the crankcase during the compression stroke of the pistons, particularly at high engine speeds. The rotary intake valve thus effectively charges the fuel mixture into the crankcase at above atmospheric pressure and thus improved the crankcase compression during the subsequent expansion stroke of the pistons.

The crankshafts are each also advantageously formed with rotary transfer valves for transferring the fuel mixture from the crankcase to the inlet ports in the cylinder, in timed relation with the movement of the pistons. These transfer valves are also advantageously arranged to produce a pumping action to augment the flow from the crankcase into the cylinder inlet ports. The rotary transfer valves are best shown in FIGS. 8, 10 and 11 and includes an inlet port 161 located adjacent the axis of the crankshaft and outlet ports 162 spaced radially outwardly from the inlet ports and interconnected by a transfer valve passage. The inlet port 161 of the transfer valve preferably opens adjacent the eccentric connecting rod portion 129, and the transfer valve passage includes a recess portion 163 and outwardly extending portions 164 which connect the recess with the outlet ports 162. The outwardly extending portions 164 are also preferably skewed in a direction opposite the direction of rotation to enhance the centrifugal pumping action of the transfer valve. The outlet ports of the transfer valve are advantageously located in the annular portion 123 of the crankshaft so as to be normally closed by the crankcase, and transfer passages are provided for communicating the outlet ports of the transfer valves to the engine air intake chest 111. As shown, crankcase 104 has a transfer passage 168 formed therein with one end positioned to communicate with the oulet ports 162 of the crankshaft 115, and a pipe or other passage 169 connects the passage 168 in the crankcase to the air intake chest 111. The other crankcase 105 has a similar transfer passage 171 formed therein and arranged for communication with the outlet ports 162 of the transfer valve, and which transfer passage is connected through a pipe 172 or the like to the air intake chest 111. Thus, the transfer valves control the flow of fuel mixture from both crankcases into the common air intake chest 111 and, in order to improve the distribution of fuel mixture in the cylinder and to improve scavenging, the transfer passages 169 and 172 are advantageously arranged to communicate with the chest 111 at substantially diametrically opposed points and with the passages disposed substantially tangent to the cylinder 101, as best shown in FIG. 14. The air intake ports 108 in the cylinder are preferably uniformly spaced therearound and, as also shown in FIG. 14, are skewed in a direction to aid in feeding the swirling fuel mixture from the chest into the cylinder.

An improved air cooling arrangement is also provided. As best shown in FIGS. 9 and 13, the exhaust manifold 112 which communicates with the exhaust ports 109 of the cylinder, is shaped to provide one or more outlet nozzles, herein shown four in number and designated 174. The outlet nozzles are all directed in the same direction and crosswise of the engine cylinder. A shroud 176 is attached to the engine and defines a generally Venturi-shaped throat 177. As shown in FIG. 13, the shroud 176 extends between the side panels 106 and 107 of the engine to form an air passageway therewith. The throat portion 177 of the shroud is disposed adjacent of the outlets of the nozzles 174 to form an ejector therewith which draws cooling air over the air cooling fins 113 when the exhaust gases from the nozzles are directed through the throat portion of the shroud. As is apparent, the flow of exhaust gases increase in proportion to the engine speed and thus produce a cooling action correlative with the engine speed, and without requiring a separate cooling fan. The engine is of the two-cycle type and includes an igniter 181 such as a spark plug, glow plug or the like.

*Operation*

For convenience in describing the operation, it is assumed that the parts are in the positions shown in FIGS. 8 and 9 as the pistons reach the end of their compression stroke. At that time, the rotary intake valves in each of the crankshafts 115 and 116 are in substantially the positions shown in FIG. 9. As the pistons begin to move in the expansion stroke, the crankshafts, which rotate in a counter-clockwise direction as viewed in FIGS. 9-12, turn the intake and transfer valves to sequentially terminate the flow of fuel mixture into the crankcases and to open the transfer passage as shown in FIG. 10 to transfer the fuel mixture from the crankcases to the air intake chest as the pistons move toward the crankcases and compress the fuel mixture in the crankcases. The transfer valves remain open until about the end of the expansion stroke of the pistons, as shown in FIG. 11. During the subsequent compression stroke of the pistons, the rotary transfer valves are first operated to close the transfer passage to block flow to the air chest from the crankcases, and the intake valves are thereafter opened to supply a succeeding charge of fuel mixture to the crankcases. Since the intake and transfer valves have their outlet ports spaced radially outwardly from the inlets, and as the valve passages are skewed in the manner described, the rotating crankshafts produce a centrifugal pumping action to both charge the fuel mixture into the crankcases at above atmospheric pressure, and to pump the fuel mixture from the crankcases into the cylinder. This centrifugal pumping action increases as the engine speed increases, and thus increases the rate of air flow to the engine at the rate correlative with the speed of the engine to supply adequate air and fuel mixture for scavenging, even at high speeds. Moreover, since the rotary valves are disposed entirely in the crankshaft, they do not require any increase in the overall volume of the crankcase and instead allow the volume to be minimized as is apparent from FIG. 8, for high crankcase compression. Lubricating passages such as 181 are conveniently provided to communicate the valve passages with the bearings, such as the connecting rod bearings 131, to supply the lubricant carrying air-fuel mixture to the bearings. In the opposed piston engine shown, the fuel mixture from the opposed crankcases is directed tangentially into the air chest, at substantially diametrically opposed points to more uniformly distribute the air mixture around the cylinder, which arrangement markedly improves scavenging. The exhaust-type cooling arrangement produces a cooling air flow over the cylinder which varies in accordance with the speed of the engine, and all without requiring a separate cooling fan or any significant loss or expenditure of power.

As is apparent, the angular positioning of the intake and transfer valves relative to the crankshaft eccentrics can be varied as desired. It has been found preferable to arrange the intake valves so that they open a small angle after bottom dead center, as is shown in FIG. 12, sufficient to allow the pressure in the crankcase to drop to substantailly atmospheric pressure before opening of the inlet valve, to thereby avoid blow back into the air inlet. Similarly, the transfer valves are also preferably arranged to open a small angle after top dead center of the pistons as shown in FIG. 10, sufficient to allow the pressure in the cylinder to drop and the pressure in the crankcase to rise to substantially the same pressure, to thereby avoid blowback from the cylinder to the crankcase.

I claim:

1. In an internal combustion engine including a crankcase, a cylinder having intake ports, a piston in said cylinder and a crankshaft mounted for rotation in the crankcase and operatively connected to the piston, the improvement comprising, first and second rotary valve means on the crankshaft each having an inlet port and an outlet port, supply passage means communicating with the inlet port of said first rotary valve means for supplying a fuel mixture thereto, inlet passage means in said crankcase having one end in continuous communication with the interior of the crankcase and the other end positioned to communicate with the outlet port of said first valve means in selected rotative positions of said crankshaft to pass fuel mixture from the supply passage to the crankcase, said second valve means having the inlet port thereof in continuous communication with the interior of the crankcase, and transfer passage means positioned to communicate with the outlet port of said second valve means in selected rotative positions of said crankshaft for passing fuel mixture from the crankcase to said intake ports in the cylinder.

2. In an internal combustion engine including a crankcase, a cylinder having intake ports, a piston in said cylinder, and a crankshaft mounted for rotation in the crankcase and operatively connected to the piston, the improvement comprising, a rotary valve means on the crankshaft having an inlet port located adjacent the axis of said crankshaft and an outlet port spaced radially outwardly from said inlet port to produce a centrifugal pumping action for forcing fuel mixture from the inlet port toward the outlet port, supply passage means communicating with said inlet port for supplying a fuel mixture thereto, inlet passage means in said crankcase having one end in continuous communication with the interior of the crankcase and the other end positioned to communicate with said outlet port of said valve means in selected rotative positions of the crankshaft to pass fuel mixture from the supply passage to the crankcase, and transfer means for passing fuel mixture from the crankcase to said intake ports in the cylinder.

3. In an internal combustion engine including a crankcase, a cylinder having intake ports, a piston in said cylinder, and a crankshaft mounted for rotation in the crankcase and operatively connected to the piston, said crankshaft having a cylindrical portion coaxial with said crankshaft, said crankcase having an annular portion extending around said cylindrical portion, a rotary valve means on said crankshaft having an inlet port located adjacent the axis of said crankshaft and an outlet port opening in said cylindrical portion of said crankshaft and spaced radially outwardly from said inlet port to produce a centrifugal pumping action when said crankshaft rotates, supply passage means communicating with said inlet port for supplying fuel mixtures thereto, said annular portion of said crankcase having an inlet passage formed therein having one end in continuous communication with the interior of the crankcase and the other end positioned to communicate with said outlet port of said valve means in selected rotative position of said crankshaft to pass fluid mixture from said supply passage to said crankcase, and transfer means for passing fuel mixture from said crankcase to said intake ports in said cylinder.

4. In an internal combustion engine, the combination of a crankcase, a cylinder having intake ports, a piston in said cylinder, a crankshaft in said crankcase and having first and second annular portions rotatably received in said crankcase and an eccentric crank portion intermediate said annular portions, said crankshaft having first and second rotary valve means therein, said first valve means including a first valve passage having an inlet port at one end of said crankshaft adjacent the center thereof and an outlet port at the periphery of said first annular portion, said second valve means including a second valve passage having an inlet port at the end of said second annular portion adjacent the crank portion and an outlet port at the periphery of said second annular portion, a fuel supply passage communicating with said inlet port of said first valve means for supplying a fuel mixture thereto, means defining an inlet passage communicating at one end with the crankcase and having its other end positioned to communicate with said outlet port of said first valve means in selected rotative positions of the crankshaft for passing fuel mixture to the crankcase, and a transfer passage communicating at one end with said intake ports in said cylinder and having its other end positioned to communicate with said outlet port of said second valve means to pass fuel mixture from the crankcase to the cylinder.

5. In an internal combustion engine, the combination of first and second cylinders in side-by-side relation, a crankcase connected to one end of each cylinder, a crankshaft rotatably mounted in said crankcase and having at least three axially aligned cylindrical portions defining main jouranl areas and first and second eccentric portions defining connecting rod journal areas intermediate adjacent main journal areas and disposed at least partially within the outer periphery of the aligned cylindrical portions, bearing means in said crankcase engaging said main journal areas to rotatably support the crankshaft, at least one of said bearings being located intermediate the ends of the crankcase to separate the same into first and second compartments, pistons in said cylinders operatively connected to said first and second eccentric portions, said crankshaft having a rotary valve means therein including a first passage having an inlet at one end of said crankshaft and an outlet communicating with said first compartment, said valve means also including a second passage in said shaft having an inlet at said one end of the shaft and an outlet communicating with said second compartment, said second passage extending through at least two of said cylindrical portions and said first eccentric portion of the crankshaft, fuel supply means communicating with said first and second passages at said one end of the crankshaft for supplying fuel mixture to the crankcases, and transfer means for passing fuel mixture from each crankcase compartment to the intake ports on the respective cylinder.

6. In an opposed piston type internal combustion engine including a cylinder having intake ports, a crankcase at each end of said cylinder, a crankshaft rotatably mounted in each crankcase, a pair of pistons in said cylinder each operatively connected to one of said crankshafts, the improvement comprising first and second rotary valve means on each crankshaft each having an inlet port and an outlet port, supply passage means communicating with the inlet port of each of said first rotary valve means for supplying a fuel mixture thereto, inlet passage means in each of said crankcases having one end in continuous communication with the respective crankcase and the other end positioned to communicate with the outlet port of said first valve means in selected rotative positions of the crankshafts to pass fuel mixture from the supply means to each crankcase, said second valve means each having the inlet port thereof in continuous communication with the respective crankcase, and transfer passage means individual to each crankcase positioned to communicate with the outlet port of a respective one of said second valve means in selected rotative positions of the crankshafts for passing fuel mixture from the crankcases to the intake ports in the cylinder.

7. The combination of claim 6 including an intake chest extending around the cylinder communicating with said intake ports in the cylinder, said transfer passage means communicating with said chest at substantially diametrically opposed points therein and extending substantially tangent to said cylinder to distribute the fuel mixture around the cylinder.

8. The combination of claim 6 wherein said first and second valve means have impeller passages between the inlet and outlet ports shaped to produce a pumping action to force fuel mixture from the inlet ports to the respective outlet ports.

9. In an internal combustion engine including a crankcase, a cylinder having intake ports, a piston in said cylinder and a crankshaft mounted for rotation in the crankcase and operatively connected to the piston, the improvement comprising, first and second rotary valve means on the crankshaft each having an inlet port and an outlet port, supply passage means communicating with the inlet port of said first rotary valve means for supplying a fuel mixture thereto, inlet passage means in said crankcase having one end in continuous communication with the interior of the crankcase and the other end positioned to communicate with the outlet port of said first valve means in selected rotative positions of said crankshaft to pass fuel mixture from the supply passage to the crankcase, said second valve means having the inlet port thereof in continuous communication with the interior of the crankcase, transfer passage means positioned to communicate with the outlet port of said second valve means in selected rotative positions of said crankshaft for passing fuel mixture from the crankcase to said intake ports in the cylinder, at least one of said valve means having impeller passages between the inlet and outlet ports thereof shaped to produce a pumping action to force fuel mixture from its inlet port to its outlet port when the crankshaft rotates.

10. In an internal combustion engine including a crankcase, a cylinder having intake ports, a piston in said cylinder and a crankshaft mounted for rotation in the crankcase and operatively connected to the piston, the improvement comprising, first and second rotary valve means on the crankshaft each having an inlet port and an outlet port, supply passage means communicating with the inlet port of said first rotary valve means for supplying a fuel mixture thereto, inlet passage means in said crankcase having one end in continuous communication with the interior of the crankcase and the other end positioned to communicate with the outlet port of said first valve means in selected rotative positions of said crankshaft to pass fuel mixture from the supply passage to the crankcase, said second valve means having the inlet port thereof in continuous communication with the interior of the crankcase, transfer passage means positioned to communicate with the outlet port of said second valve means in selected rotative positions of said crankshaft for passing fuel mixture from the crankcase to said intake ports in the cylinder, at least one of said valve means having impeller passages between the inlet and outlet ports that spiral in a direction opposite the direction of rotation of the crankshaft to produce a pumping action to force fuel mixture from its inlet port to its outlet port when the crankshaft rotates.

11. In an internal combustion engine including a crankcase, a cylinder having intake ports, a piston in said cylinder and a crankshaft mounted for rotation in the crankcase and operatively connected to the piston, the improvement comprising, first and second rotary valve means on the crankshaft each having an inlet port and an outlet port, supply passage means communicating with the inlet port of said first rotary valve means for supplying a fuel mixture thereto, inlet passage means in said crankcase having one end in continuous communication with the interior of the crankcase and the other end positioned to communicate with the outlet port of said first valve means in selected rotative positions of said crankshaft to pass fuel mixture from the supply passage to the crankcase, said second valve means having the inlet port thereof in continuous communication with the interior of the crankcase, transfer passage means positioned to communicate with the outlet port of said second valve means in selected rotative positions of said crankshaft for passing fuel mixture from the crankcase to said intake ports in the cylinder, at least one of said valve means having its inlet port disposed adjacent the axis of said crankshaft and its outlet port spaced radially from the inlet port to produce a centrifugal pumping action to force fuel mixture from its inlet port to its outlet port when the crankshaft rotates.

12. In an internal combustion engine including a crankcase, a cylinder having intake ports, a piston in said cylinder and a crankshaft mounted for rotation in the crankcase and operatively connected to the piston, the improvement comprising, first and second rotary valve means on the crankshaft each having an inlet port and an outlet port, supply passage means communicating with the inlet port of said first rotary valve means for supplying a fuel mixture thereto, inlet passage means in said crankcase having one end in continuous communication with the interior of the crankcase and the other end positioned to communicate with the outlet port of said first valve means in selected rotative positions of said crankshaft to pass fuel mixture from the supply passage to the crankcase, said second valve means having the inlet port thereof in continuous communication with the interior of the crankcase, transfer passage means positioned to communicate with the outlet port of said second valve means in selected rotative positions of said crankshaft for passing fuel mixture from the crankcase to said intake ports in the cylinder, each of said valve means having its inlet port disposed adjacent the axis of said crankshaft and its outlet port spaced radially from the inlet port to produce a centrifugal pumping action to force fuel from its inlet port to its outlet port when the crankshaft rotates.

References Cited in the file of this patent

UNITED STATES PATENTS

| 1,105,882 | Crawford | Aug. 4, 1914 |
| 2,231,392 | McCarthy | Feb. 11, 1941 |
| 2,246,446 | Kylen | June 17, 1941 |
| 2,346,463 | Szekely | Apr. 11, 1944 |
| 2,639,697 | Warner | May 26, 1953 |
| 2,718,884 | Haage et al. | Sept. 27, 1955 |
| 2,799,261 | Porshe et al. | July 16, 1957 |

FOREIGN PATENTS

| 395,072 | Great Britain | July 13, 1933 |